(12) United States Patent
Cardillo et al.

(10) Patent No.: US 6,690,291 B1
(45) Date of Patent: Feb. 10, 2004

(54) VEHICLE HAZARD WARNING SYSTEM

(75) Inventors: Alfredo Cardillo, Roseville, MI (US); Donald L. McAlpine, Redford, MI (US)

(73) Assignee: Prodesign Technology, Inc., Roseville, MI (US)

( * ) Notice: Subject to any disclaimer, the term of this patent is extended or adjusted under 35 U.S.C. 154(b) by 0 days.

(21) Appl. No.: 09/553,816

(22) Filed: Apr. 21, 2000

(51) Int. Cl.[7] .................................................. G08G 1/00
(52) U.S. Cl. ........................ 340/901; 340/902; 340/904; 340/905; 340/936
(58) Field of Search ................................ 340/901, 902, 340/904, 905, 936, 935, 539

(56) References Cited

U.S. PATENT DOCUMENTS

| | | | |
|---|---|---|---|
| 3,710,313 A | | 1/1973 | Kimball ........................ 340/902 |
| 5,808,560 A | | 9/1998 | Mulanax ........................ 340/902 |
| 5,825,304 A | | 10/1998 | Marin ........................ 424/130.1 |
| 5,917,430 A | * | 6/1999 | Greneker et al. ............ 340/905 |
| 5,959,551 A | | 9/1999 | Cardillo ........................ 340/902 |
| 6,163,277 A | * | 12/2000 | Gehlot ........................ 340/905 |
| 6,317,058 B1 | * | 11/2001 | Lemelson et al. .......... 340/910 |
| 6,442,473 B1 | | 8/2002 | Berstis et al. ................ 235/492 |
| 6,515,596 B2 | * | 2/2003 | Awada ........................ 340/905 |

* cited by examiner

*Primary Examiner*—Daryl Pope
(74) *Attorney, Agent, or Firm*—Harness, Dickey & Pierce, P.L.C.

(57) ABSTRACT

A road hazard warning system provides a warning to a motorist driving a vehicle of a stationary or moving hazard. A warning system includes a transmitter located near the road hazard that generates a radio frequency (RF) warning signal. A receiver is located in the vehicle and receives the RF warning signal. A receiver is located in the vehicle and receives the RF warning signal. The receiver is preferably integrated with an electronic device associated with the vehicle. The electronic device is at least one of a vehicle radio system, a tape player, a compact disc player, a television, an in-car computer, a video game, a telephone, and a global positioning system. The electronic device generates a warning output signal to a speaker or a display when the RF warning signal is detected by the receiver. A vehicle electronics interface is connected to the electronic device and provides a vehicle speed signal to the electronic device. The RF warning system contains data specifying a localized temporary speed limit. The electronic device compares the localized temporary speed limit with the vehicle speed signal and generates a second warning output signal with the vehicle speed signal and generates a second warning output signal if the vehicle speed exceeds the temporary speed limit. A vehicle speed controller is connected to the electronic device and reduces the vehicle speed if the vehicle speed exceeds the localized temporary speed limit.

12 Claims, 5 Drawing Sheets

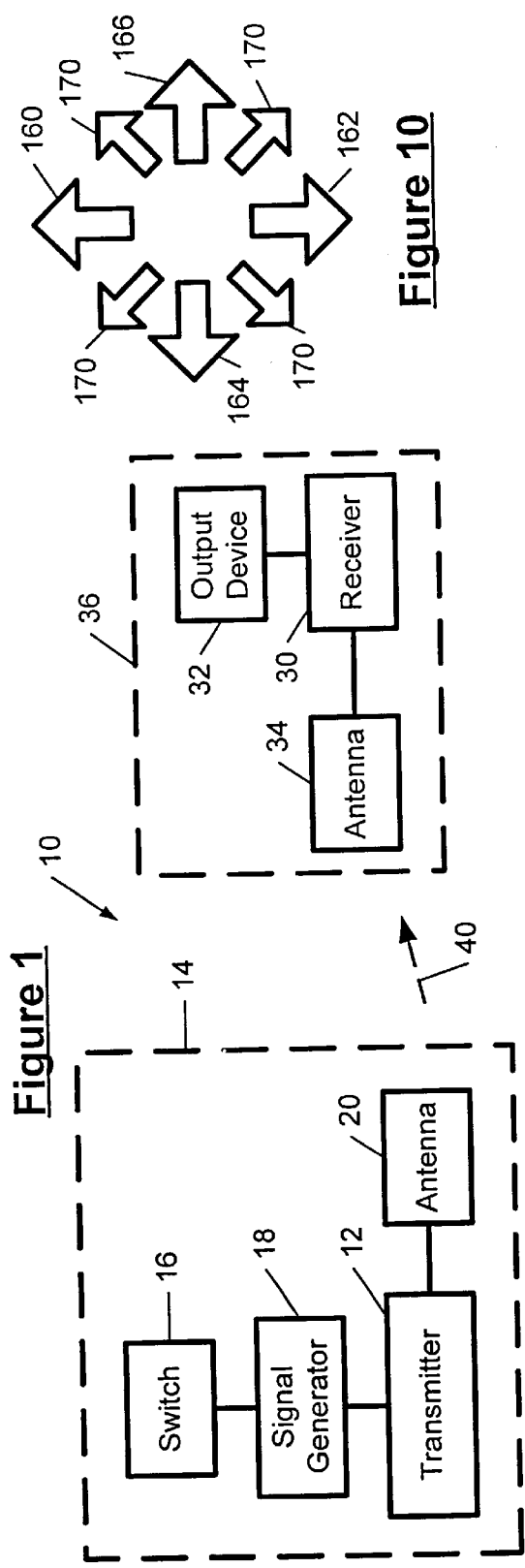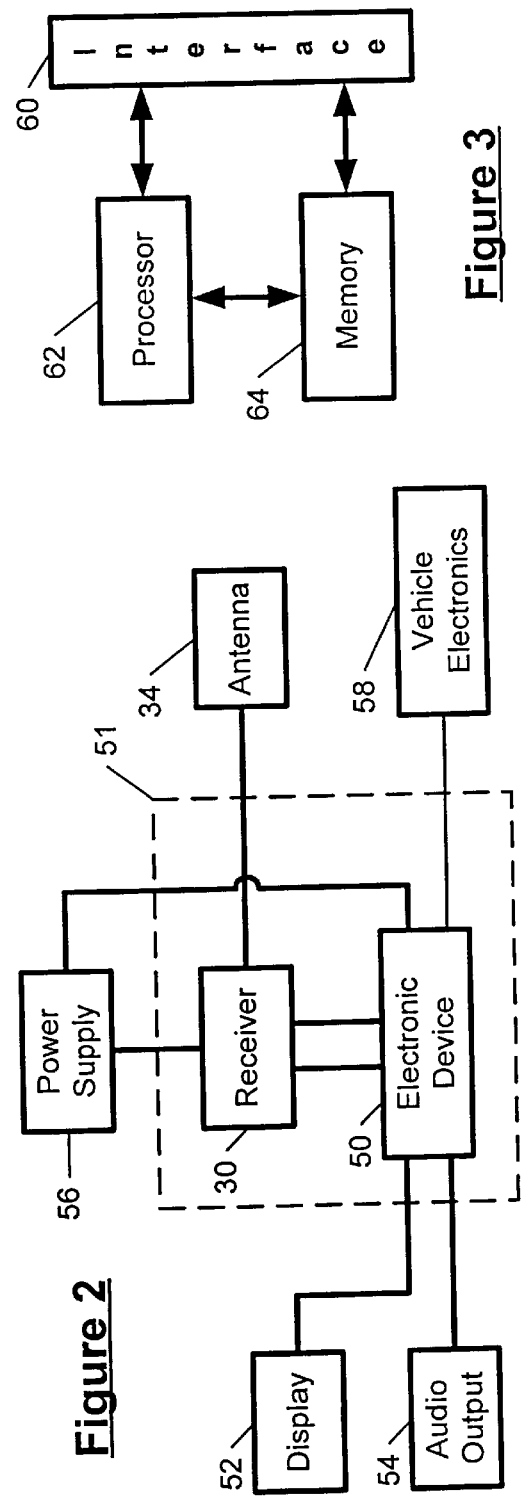

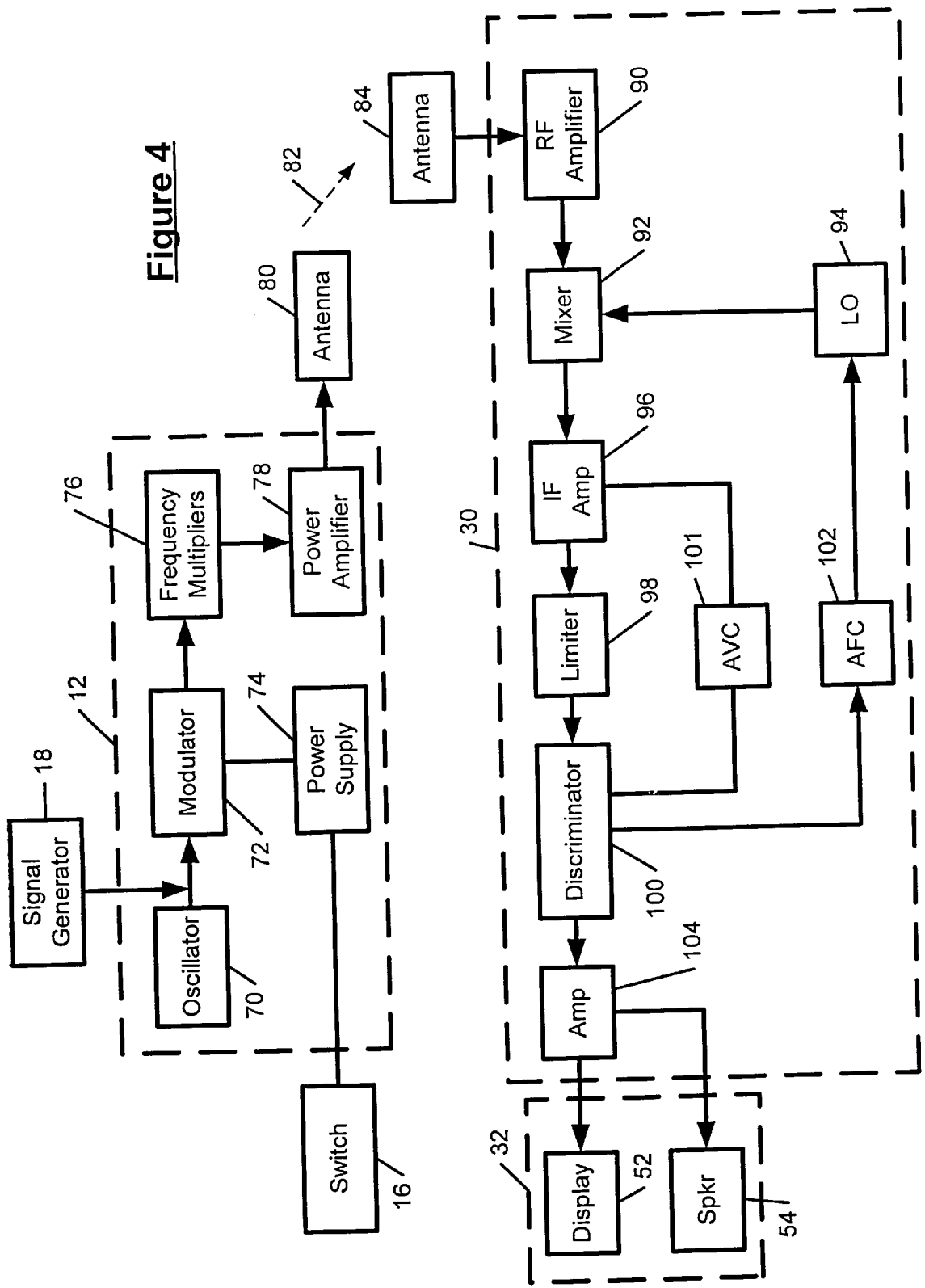

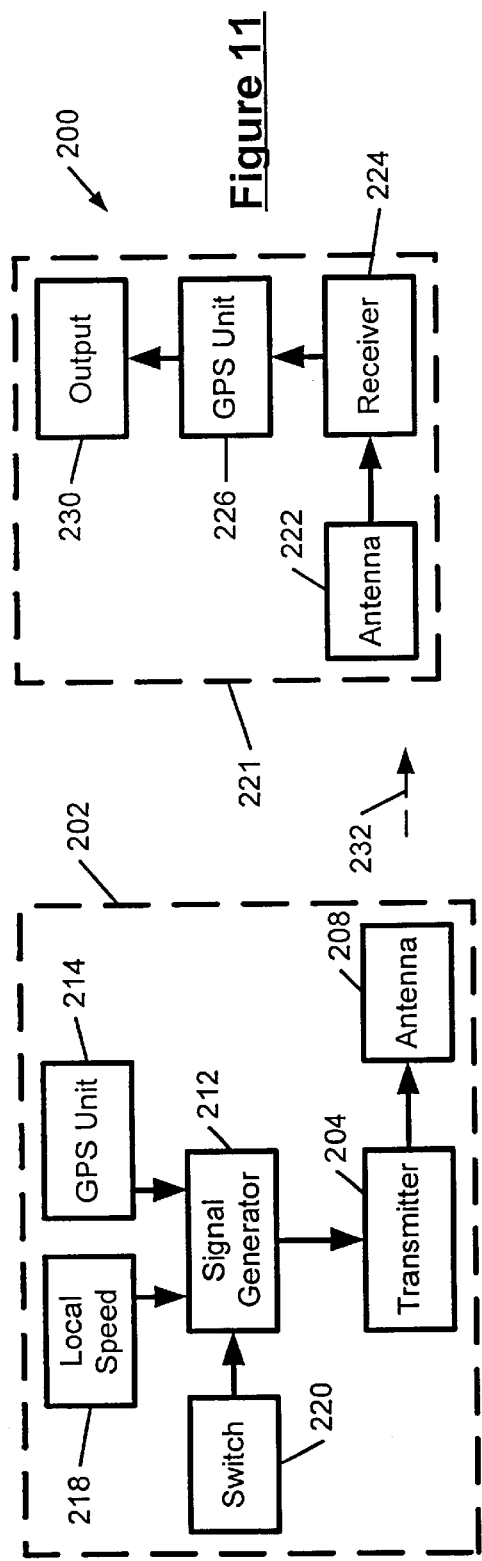
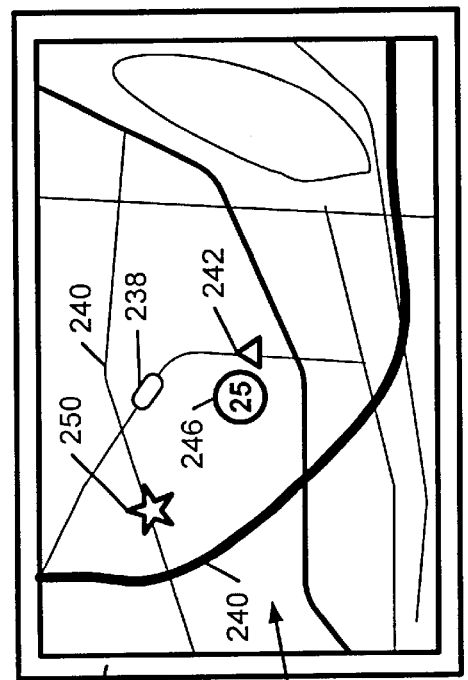
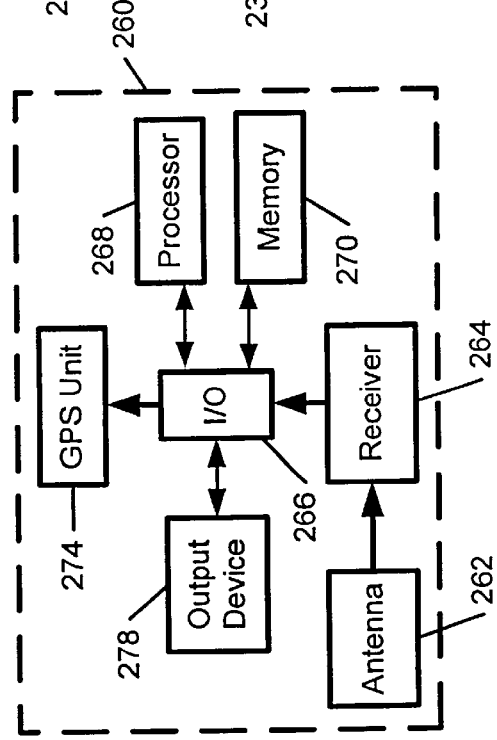
Figure 11
Figure 12
Figure 13

VEHICLE HAZARD WARNING SYSTEM

TECHNICAL FIELD

This invention relates to electronic devices for identifying a hazardous situation for a vehicle and, more particularly, to electronic warning devices used to alert a motorist to hazardous situations such as construction zones, school zones, accident sites, and emergency vehicles.

BACKGROUND OF THE INVENTION

There are many instances when emergency vehicles, such as police cars, ambulances, and fire trucks use sirens, beacons, and/or flashing lights to alert motorists and pedestrians to yield. Other vehicles such as tow trucks, delivery vehicles, school buses, and utility repair vehicles may also use alarms and/or flashing lights when reversing, obstructing traffic, or carrying an oversized load.

There are many instances when emergency vehicles fail to adequately warn motorists as to their presence. For example, emergency flashers and beacons are harder to spot during daylight hours than at night. Sirens or other audible warnings are harder to detect when motorists are using the car radio or when local ambient noise is relatively high. If motorists or pedestrians fail to yield right of way, emergency vehicles may become involved in traffic accidents that may result in the loss of life due to inadequate warning of a hazardous situation. Oftentimes, accident victims do not have ample warning of the hazard.

Because the population is living longer, the number of senior citizens who drive vehicles will continue to be a growing segment of the population. As people age, their reaction times tend to increase. For senior drivers, the response time required to comprehend the hazardous situation and to react accordingly also increases. Therefore, an earlier warning of a hazardous situation such as an emergency vehicle is desirable.

Conventional warning systems also fail to identify the location of the emergency vehicle or hazardous situation relative to the motorist to be warned. Without knowing the direction of approach of an emergency vehicle, it is difficult for a motorist to know how to get out of the way.

If delivery trucks, repair vehicles and other less dangerous vehicles begin using loud sirens and flashing lights, the warning effect of sirens and flashing lights will be diminished due to over-use.

SUMMARY OF THE INVENTION

The present invention discloses a system for providing a warning of a road hazard to a motorist driving a vehicle. The warning system includes a transmitter located near the road hazard that generates a radio frequency (RF) warning signal. A receiver is located in the vehicle and receives the RF warning signal. An electronic device is connected to the receiver and is located in the vehicle. The electronic device generates a warning output signal to an audio or a video output device connected to the electronic device when the RF warning signal is detected by the receiver. The electronic device is at least one of a vehicle radio system, a tape player, a compact disc player, a television, an in-car computer, a video game, a telephone, or a global positioning system.

In other features, the receiver and electronic device form an integrated circuit. The electronic device includes a processor, an input/output (I/O) interface and memory. The I/O interface is connected to a vehicle electronics interface which generates a vehicle speed signal. The RF warning signal contains data specifying a localized temporary speed limit. The processor decodes the localized temporary speed limit from the data. The processor compares the localized temporary speed limit with the vehicle speed signal and generates a second warning output signal to notify the motorist that the vehicle speed exceeds the localized temporary speed limit.

In another feature, a vehicle speed controller is connected to the processor. The processor reduces the vehicle speed if the vehicle speed exceeds the localized temporary speed limit.

In still other features, a direction indicator is connected to the processor and generates at least one of an audio signal and a video signal that indicates a location of the road hazard relative to the vehicle. The direction indicator preferably includes a plurality of antennas connected to the receiver and the processor.

In yet another feature, of the invention, the RF warning signal specifies one of a plurality of different warning levels. The electronic device outputs a plurality of different output signals based on the warning level received by the receiver and the processor.

Still other features, benefits and advantages will be apparent from the specification, the drawings and the claims.

BRIEF DESCRIPTION OF THE DRAWINGS

FIG. 1 is a functional block diagram of an emergency warning system according to the present invention and including a transmitter associated with a hazardous situation, and a receiver associated with a motorist's vehicle;

FIG. 2 is a functional block diagram of the receiver of FIG. 1 integrated with an existing vehicle electronic device;

FIG. 3 is a functional block diagram illustrating a processor, memory and an interface that are associated with the vehicle electronic device of FIG. 2;

FIG. 4 is a functional block diagram of a transmitter and a receiver according to one embodiment of the present invention;

FIG. 10 illustrates a directional display for identifying the location of the hazardous situation or vehicle relative to the motorist's vehicle;

FIG. 11 illustrates a function block diagram of a transmitter associated with a first global positioning system and a receiver associated with a second global positioning system according to an alternate embodiment of the present invention;

FIG. 12 illustrates a display that is associated with the second global positioning system of FIG. 11; and FIG. 13 is a functional block diagram of an alternate receiving unit associated with the motorist's vehicle.

DETAILED DESCRIPTION

Figure 7:
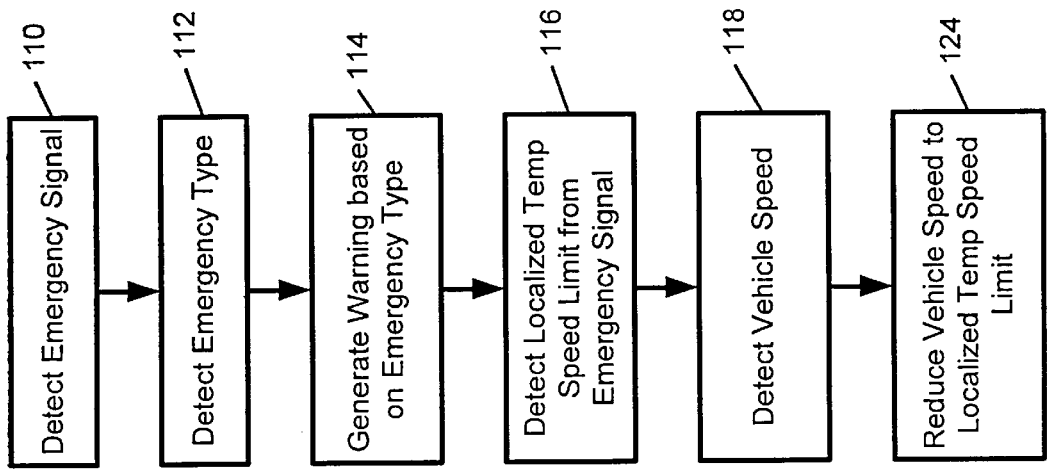
FIG. 7 illustrates the steps associated with detecting and reducing vehicle speed based on the hazard signal.

With reference to FIG. 1, a hazard warning system 10 is illustrated and includes a transmitter 12 associated with a hazardous situation 14. The hazardous situation 14 can be moving such as an emergency vehicle, a school bus, a police car, an ambulance, or stationary such as a construction zone, a school zone, an accident site, a delivery vehicle making deliveries, a repair vehicle, etc.

The transmitter 12 is connected to a switch 16 which actuates the transmitter 12. The switch 16 is thrown when the hazardous situation is present, such as when an ambulance is going to an emergency or returning to a hospital. A signal generator 18 is connected to the switch 16. An antenna 20 transmits signals generated by the transmitter 12. A power supply (not shown) is also associated with the transmitter 12 and provides power to the transmitter 12.

A receiver 30 is connected to an output device 32 and an antenna 34. The output device 32 includes an audio output device 52 such as a speaker and/or a visual output device 54 such as a liquid crystal display (LCD), a light-emitting diode (LED), a cathode ray tube (CRT), a lamp, or other suitable visual display devices. The receiver 30 is associated with a vehicle 36 that is operated by a motorist. A hazard signal (identified at 40) is transmitted by the transmitter 12 when the switch 16 is actuated. Information is encoded into the hazard signal using the signal generator 18. For example, the signal generator 18 includes information concerning a localized temporary speed limit. The hazard signal is transmitted by the antenna 20 to the antenna 34 and the receiver 30 associated with the motorist's vehicle 36 as will be described in further detail below.

In use, personnel associated with the hazardous situation 14 toggle the switch 16 which triggers the signal generator 18 and transmitter 12 to output the hazard signal 40. The transmitter 12 employs suitable signal processing techniques such as amplitude modulation (AM), frequency modulation (FM), pulse width modulation (PWM), spread spectrum (SS), or other suitable signal processing techniques. The transmitter 12 generates the hazard signal 40 and transmits the hazard signal 40 via the antenna 20.

The antenna 34 associated with the motorist's vehicle 36 receives the hazard signal 40 and outputs the hazard signal to the receiver 30. The receiver 30 generates an audio warning signal such as a beeping noise and/or a visual signal such as a flashing lamp or LED to alert the motorist.

Referring to FIG. 2, one embodiment of the hazard warning system 10 is illustrated. The receiver 30 is integrated with an electronic device 50 such as a radio, tape player, CD player, CB radio, television, video game, in-car computer, GPS, telephone, etc., to reduce costs. The receiver 30 is fabricated on the same circuit board as the electronic device 50 to form an integrated circuit. For example, the electronic device 50 is the car radio and the receiver 30 is fabricated on the same circuit board as the car radio. If the hazard signal 40 is transmitted at a frequency associated with FM or AM broadcasting, or if the signal 40 is generated at a frequency that can be received by an antenna associated with the car radio, the antenna 34 can be omitted and the antenna associated with the electronic device 50 can be used. Alternately, a thin wire located in a windshield of the vehicle or a metallic body panel can be used as an antenna.

If the electronic device 50 is a car radio, the visual output device or display 52 is a radio faceplate and the audio output device 52. is one or more audio speakers. The electronic device 50 and the receiver 30 can be powered by a power supply 56. As can be appreciated by skilled artisans, by integrating the receiver 30 with the electronic device 50, duplicate power supplies, antennas, displays and speakers can be eliminated. The electronic device 50 can be connected to other vehicle electronic devices 58 such as an engine control module (ECM) or a data bus for vehicle information systems.

Referring now to FIG. 3, the electronic device 50 typically includes an input/output interface (I/O) 60 which is connected to a processor 62 and memory 64. Memory 64 includes read only memory (ROM) and random access memory (RAM). The processor 62 controls the operation of the electronic device 50. Preferably, the processor 62 controls the recovery of information contained in the hazard signal and/or the detection of the hazard signal by the receiver 30.

Referring now to FIG. 4, a preferred embodiment of the transmitter 12 and the receiver 30 is illustrated. The transmitter 12 is a frequency modulated transmitter that includes an oscillator 70 that is connected to the signal generator 18 and a modulator 72. The modulator 72 is connected to a power supply 74 and one or more frequency multipliers 76. The power supply 74 can be connected to other components of the transmitter 12 if needed. A power amplifier 78 is connected to the frequency multipliers 76 and to an antenna 80. As can be appreciated, the transmitter 12 illustrated in FIG. 4 performs frequency modulation (FM) for encoding information contained in a signal output by the signal generator 18 in a conventional manner.

In use, information is contained in the signal output by the signal generator 18. The transmitter frequency modulates the signal, amplifies the frequency modulated signal, and outputs the frequency modulated signal (shown at 82) via the antenna 80.

The receiver 30 includes an antenna 84 which is coupled to an RF amplifier 90 which amplifies a signal received by the antenna 34 and outputs the signal to a mixer 92. The mixer 92 mixes the signal received by the RF amplifier with a signal generated by a local oscillator 94. The signal output by the mixer 92 is input to one or more intermediate frequency (IF) amplifiers 96. The signal output by the IF amplifier 96 is input to a limiter 98 which outputs a signal having a variable frequency and a relatively constant amplitude. A discriminator 100 translates frequency variations of the signal into an audio signal. An amplifier 102 amplifies the discriminated signal. The signal output by the amplifier 102 can be used to drive a display 52 or a speaker 54. Because the signal will generally have a high frequency, the display may appear to have a constant "ON" state and the speaker will sound as if a continuous tone is being generated.

As can be appreciated, different emergency signals can be generated for different types of hazards. This can be accomplished by varying the frequency of the signal generated by the signal generator when frequency modulation is used. The amplitude of the signal can be varied if amplitude modulation is employed. Pulse width modulation, data encoding or other suitable techniques can be employed.

For example, a severe hazard warning signal can be generated for fire, ambulance and police vehicles which may require a prompt response from the motorist. In response to the severe hazard warning, the receiver 30 generates a first type of emergency signal such as triggering a harsh audio warning signal, illuminating a bright lamp, initiating a recorded message, or turning the radio off. A second level emergency warning signal message indicates that school zones, accident scenes and/or construction sites are nearby. The second level hazard warning signal includes turning the volume of the radio down but not off, triggering a medium volume level audio warning signal, flashing a lamp at a medium pace, and/or playing a recorded message. A low level hazard warning is issued by the transmitter 10 for repair or delivery vehicles that are in the vicinity of the motorist's vehicle. In response to the low level hazard warning signal, the receiver and/or processor triggers a low volume level audio signal, flashes a lamp at a medium pace, or plays a recorded message.

Figure 5:
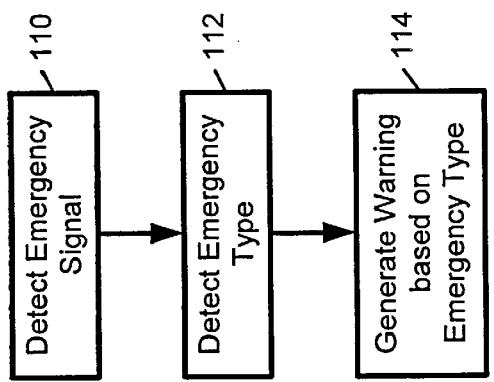
FIG. 5 illustrates steps for detecting and generating a hazard signal.

Referring now to FIG. 5, operational steps associated with a first hazard warning system are shown. The receiver 30 and/or the receiver 30 in combination with the electronic device 50 or the processor 62 detects the hazard signal at step 110. At step 112, the type of emergency is detected if the hazard signal possible contains more than one different type. At step 114, a warning signal that includes audio and/or visual output is generated based on the type of emergency as previously described above.

Figure 6:
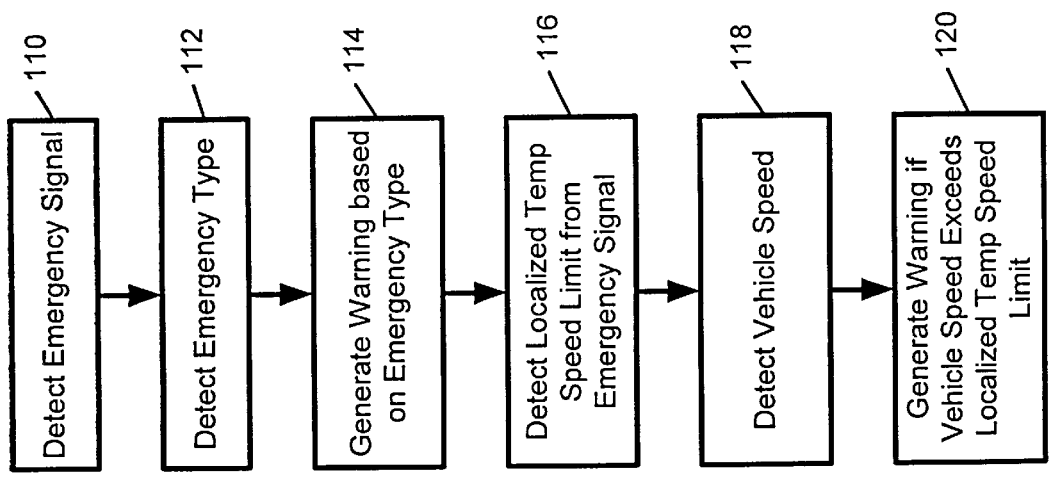
FIG. 6 illustrates the steps for detecting and generating a speed limit warning from the hazard signal.

In FIG. 6, the steps 110–114 are performed. In step 116, a localized temporary speed limit signal is detected from the hazard signal. At step 118, the speed of the motorist's vehicle 36 is detected from the vehicle electronics 58. At step 120, an additional hazard warning is generated if the speed of the motorist's vehicle exceeds the localized temporary speed limit contained in the hazard signal. The additional hazard warning can be an alarm, an alphanumeric message output on an LED display, a recorded message, a light or other suitable indicator.

In FIG. 7, steps 110, 112, 114, 116, and 118 from FIG. 6 are performed. At step 124, the speed of the vehicle is reduced to the localized temporary speed limit by the vehicle's electronics 58 (through fly-by-wire systems, traction control, anti-lock braking systems (ABS), etc.).

Figure 8:
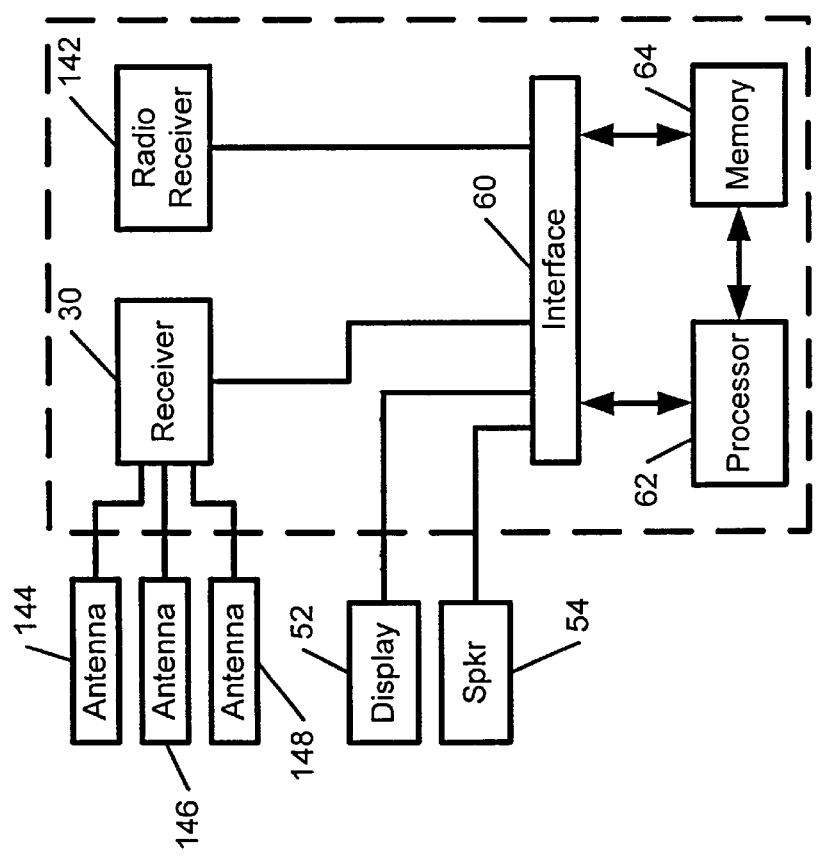
FIG. 8 illustrates another embodiment of the hazard warning system that identifies the location of a hazardous situation or vehicle relative to the motorist's vehicle.

Referring now to FIG. 8, a hazard warning system with directional capabilities is illustrated. The receiver 30 is preferably integrated with a radio receiver 142. The interface 60, the processor 62 and the memory 64 of the radio receiver 142 are connected to the receiver 30, the display 52 and one or more speakers 54. The speakers 54 are preferably the speakers associated with the radio receiver 142. A plurality of antennas 144, 146, and 148 are located in a spaced relationship and are connected to the receiver 30. The receiver 30, the interface 60, the processor 62, and the memory 64 perform signal triangulation on the hazard signals received by the antennas 144, 146, and 148 in a conventional manner. As can be appreciated, the location of the transmitter 12 associated with the hazard (such as the emergency vehicle) can be determined relative to the motorist's vehicle and output via a directional visual display or by an audio message.

Figure 9:
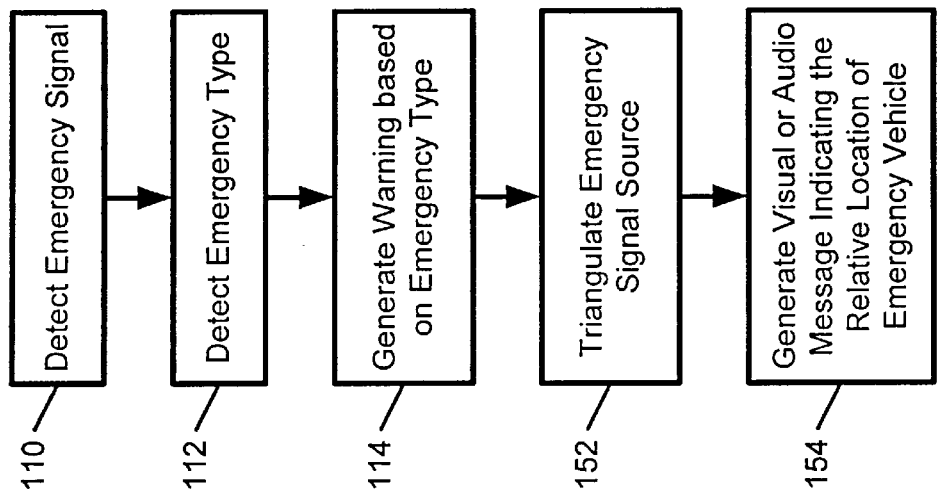
FIG. 9 illustrates steps associated with generating a visual or audio message indicating the relative location of the emergency vehicle.

In FIG. 9, steps 110, 112, and 114 from FIGS. 5–7 are performed. At step 152, the hazard signal received by the antennas 144, 146, and 148 are triangulated. At step 154, the visual or audio message is generated to indicate the relative location of the emergency vehicle relative to the motorist's vehicle.

In FIG. 10, a preferred visual display device 52 is illustrated. An arrow 160 identifies hazardous situations in front of the vehicle. An arrow 162 identifies hazardous situations behind the vehicle. Arrows 164 and 166 identify hazardous situations to the left and right of the vehicle, respectively. Other arrows 170 identify directions in between the arrows 160, 162, 164 and 166.

Referring now to FIG. 11, an alternate hazard warning system 200 for a hazardous situation 202 is illustrated and includes a transmitter 204 that is connected to an antenna 208. A signal generator 212 is connected to the transmitter 204. A GPS unit 214 and a local speed signal generator 218 are connected to the signal generator 212. A switch 220 is connected to the signal generator 212.

A motorist's vehicle 221 includes an antenna 222 that is coupled to a receiver 224. A GPS unit 226 is connected to the receiver 224. An output device 230 is connected to the GPS unit 226. The output device 230 can be a directional unit illustrated in FIG. 10, a display associated with the GPS unit 226, or an audio output such as a computerized voice output by a speaker.

In use, personnel associated with the hazardous situation 202 toggle the switch 220 to actuate the signal generator 212. The GPS unit 214 generates longitude and latitude information in a conventional manner. The local speed generator 218 generates a local speed signal if applicable (otherwise only the location information is generated). The signal generator 212 and the transmitter 204 employ suitable signal processing techniques such as those described above to generate a warning a signal 232 that is transmitted via the antenna 208. The antenna 222 receives RF signals containing the warning signal 232 and outputs the RF signals containing the warning signal to the receiver 224. The receiver 224 employs signal processing techniques that correspond to those employed by the transmitter 204 to process the information. The receiver 224 recovers the warning signal that contains the longitude and latitude information and the localized speed limit (if applicable) from the warning signal 232. The recovered information is input to the GPS unit 226. The GPS unit 226, in turn, outputs the information to the output device 230 which can be aural and/or visual as previously described.

Referring now to FIG. 12, the output device 230 of FIG. 11 preferably includes a visual output device 234 which provides a map 235 of an area surrounding the vehicle 221. The GPS unit 226 generates a symbol 238 that represents the position of the motorist's vehicle 221 relative to roads 240 on the map 235. The GPS unit 226 also generates a first symbol 242 that represents a stationary hazard and a second symbol 246 which identifies a local speed limit in an area surrounding the stationary hazard. The GPS unit 226 generates a third symbol 250 that represents a moving hazard such as an ambulance. The GPS unit 226 preferably employs color, size, and/or flashing symbols to identify the severity of the hazard. Moving symbols represent moving hazards.

Referring now to FIG. 13, an alternate embodiment of receiving electronics associated with the motorist's vehicle 260 is illustrated. The receiving electronics can be substituted for the receiving electronics illustrated in the box identified at 221 in FIG. 11. The receiving electronics include an antenna 262 that is connected to a receiver 264. An output of the receiver 264 is connected to an input/output interface 266 which is connected to a processor 268 and memory 270. A GPS unit 274 is connected to the input/output interface 266. A visual or audio output device 278 is connected to the input/output interface 266. Alternately, the output device 278 can be connected to or associated with the GPS unit 274.

In use, the antenna 262 receives RF signals containing the warning signal 232 generated by the transmitter 204 and the antenna 208. The receiver 264 isolates the warning signal from the RF signals received by the antenna 262 and outputs the warning signal to the input/output interface 266. The processor 268 and the memory 270 perform suitable signal processing to recover the data contained in the warning signal 232. The GPS unit 274 provides a signal representing a local position of the motorist's vehicle 260 to the processor 268 and the memory 270 via the input/output interface 266.

The processor 268 calculates a position of the hazard relative to the motorist's vehicle and outputs a direction signal to the output device 274. The direction signal can be a computerized voice output by a speaker, a display such as the display of FIG. 10 or 12, or other suitable visual or aural output.

The warning system according to the invention provides motorists with an improved warning system for hazardous situations. By providing an indication of relative direction, the motorist is more likely to avoid an accident. By providing various different types of warning signals, the motorist knows more about the hazardous situation. By incorporating speed control, vehicle speed in the vicinity of the hazardous situation can be controlled. Other objects, features and advantages will be apparent to skilled artisans.

While the invention has been described in its presently preferred embodiments, it will be understood that the invention is capable of certain modification and change without departing from the spirit of the invention as set forth in the appended claims.

What is claimed is:

1. A system for providing a warning of a road hazard to a motorist driving a vehicle, comprising:
   a transmitter located near said road hazard that generates a radio frequency (RF) warning signal;
   a receiver located in said vehicle that receives said RF warning signal directly from said transmitter; and
   an electronic device connected to said receiver and located in said vehicle that generates a warning output signal to one of an audio and visual output device connected to said electronic device when said RF warning signal is detected by said receiver, wherein said electronic device is at least one of a vehicle radio system, a tape player, a compact disc player, a television, an in-car computer, a video game, a telephone, and a global positioning system,
   wherein said receiver and said electronic device form an integrated circuit;
   a processor, an input/output (I/O) interface and memory connected to said electronic device; and
   a direction indicator connected to said processor for generating at least one of an audio signal and a visual signal that indicates a location of said road hazard relative to said vehicle.

2. The warning system of claim 1 further comprising:
   a vehicle electronics interface connected to said I/O interface for generating a vehicle speed signal.

3. The warning system of claim 1 wherein said road hazard is at least one of a fire truck, a police vehicle, an ambulance, a school zone, a school bus, a construction site, a delivery vehicle, a repair vehicle, and an accident scene.

4. The warning system of claim 2 wherein said RF warning signal contains data specifying a localized temporary speed limit, and wherein said processor decodes said localized temporary speed limit from said data.

5. The warning system of claim 3 wherein said processor compares said localized temporary speed limit with said vehicle speed signal and generates a second warning output signal to notify said motorist that said vehicle speed exceeds said localized temporary speed limit.

6. The warning system of claim 4 further comprising
   a vehicle speed controller connected to said processor wherein the processor reduces said vehicle speed if said vehicle speed exceeds said localized temporary speed limit.

7. The warning system of claim 1 wherein said direction indicator includes a plurality of antennas connected to said receiver and said processor.

8. The warning system of claim 1 wherein said RF warning signal specifies one of a plurality of different warning levels.

9. The warning system of claim 8 wherein said electronic device outputs a plurality of different output signals based on said one of said plurality of different warning signals.

10. The warning system of claim 1 wherein said electronic device is a cellular telephone, and wherein an antenna of said cellular telephone receives said RF warning signals.

11. A system for providing a warning of a road hazard to a motorist driving a vehicle, comprising:
    a transmitter located near said road hazard that generates a radio frequency (RF) warning signal;
    a first receiver located in said vehicle that receives said RF warning signal directly from said transmitter; and
    a radio system, located in said vehicle and including a processor, a second receiver, and an audio speaker, that receives RF signals and generates audio signals having volume level,
    wherein when said first receiver detects said RF warning signal, said processor of said radio system lowers said volume level; and
    a direction indicator connected to one of said first receiver and said radio system, wherein when said first receiver detects said RF warning signal, said direction indicator provides an output signal that indicates a direction of said hazard relative to said vehicle.

12. The hazard warning system of claim 11 wherein when said first receiver detects said RF warning signal, said processor generates an audible warning signal after lowering said volume to alert said motorist of said road hazard.

* * * * *